April 29, 1924.
L. H. BRINKMAN ET AL
1,492,067
APPARATUS FOR MAKING TUBES
Filed March 8, 1917     4 Sheets-Sheet 1
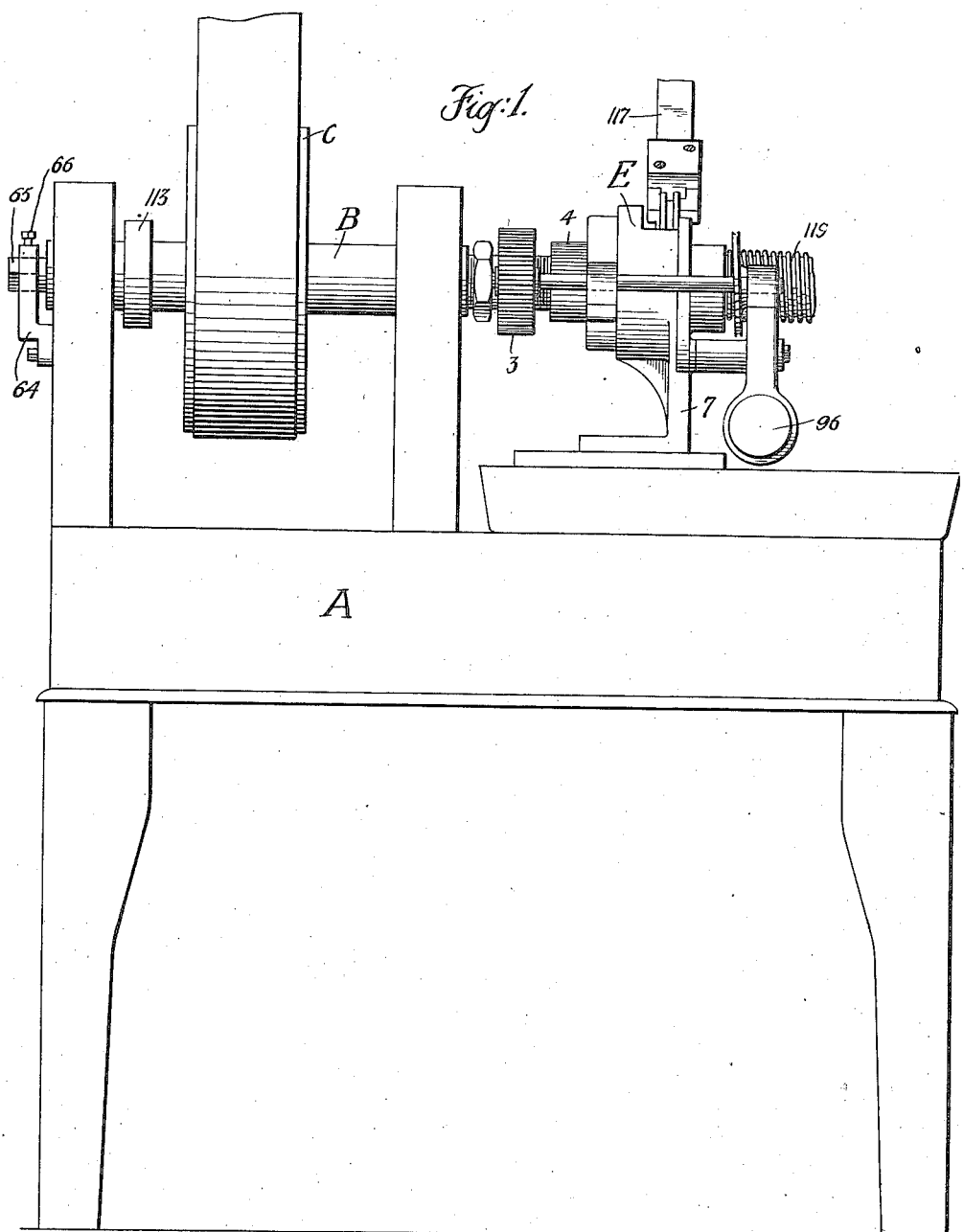

April 29, 1924.
L. H. BRINKMAN ET AL
1,492,067
APPARATUS FOR MAKING TUBES
Filed March 8, 1917     4 Sheets-Sheet 2
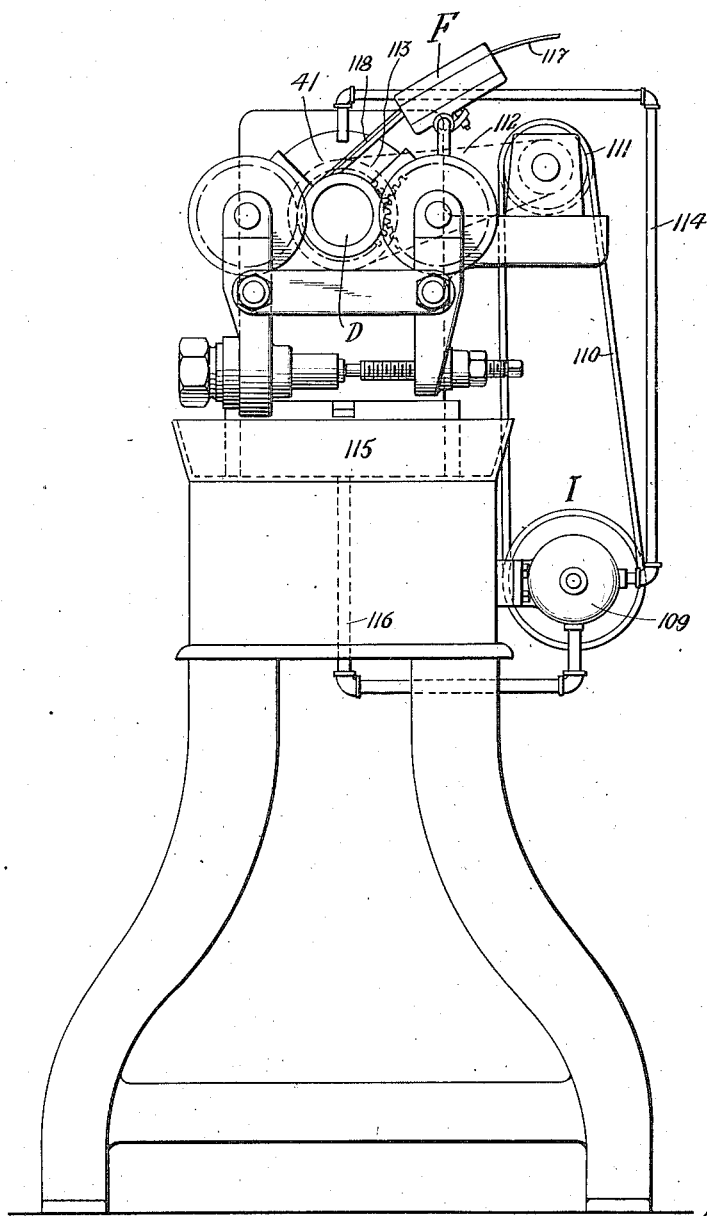

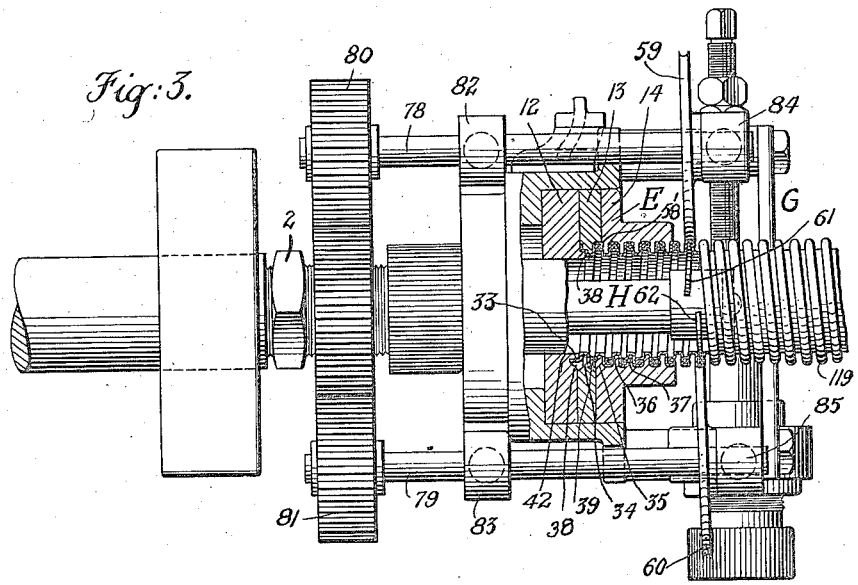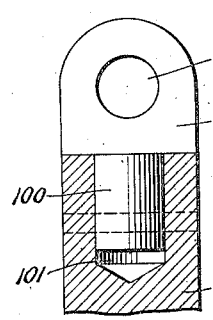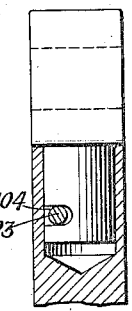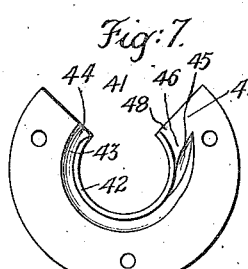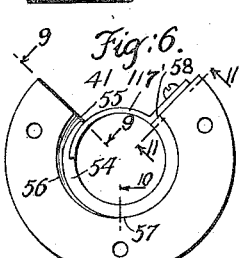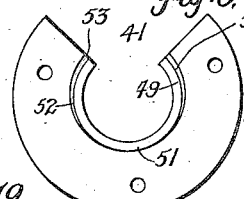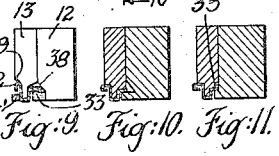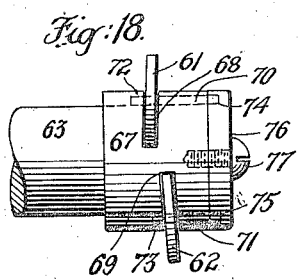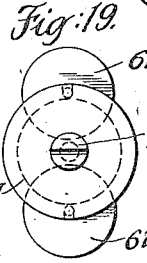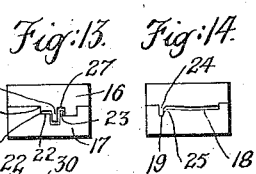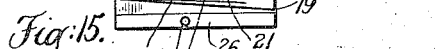

April 29, 1924.
L. H. BRINKMAN ET AL
APPARATUS FOR MAKING TUBES
Filed March 8, 1917 4 Sheets-Sheet 4
1,492,067
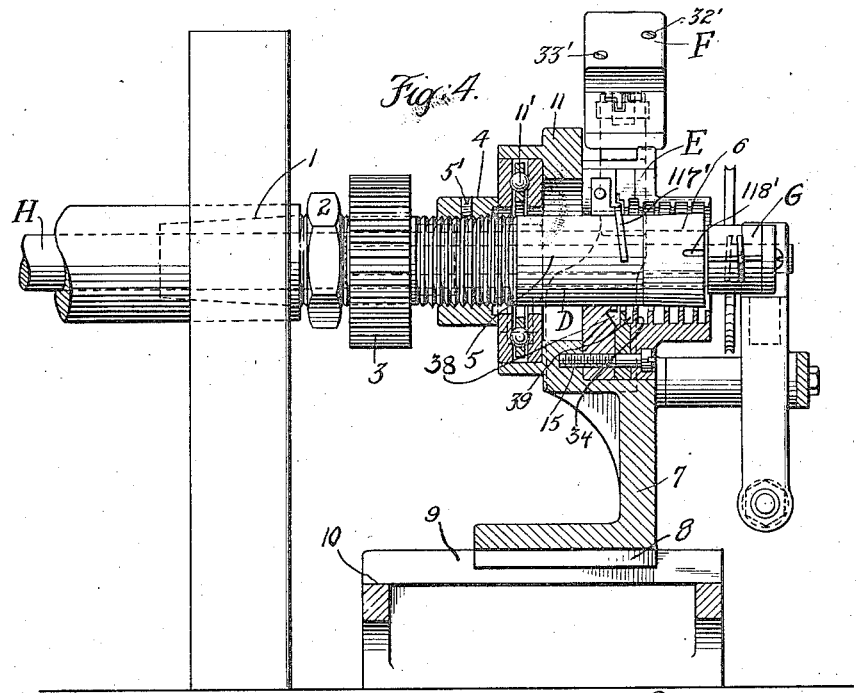
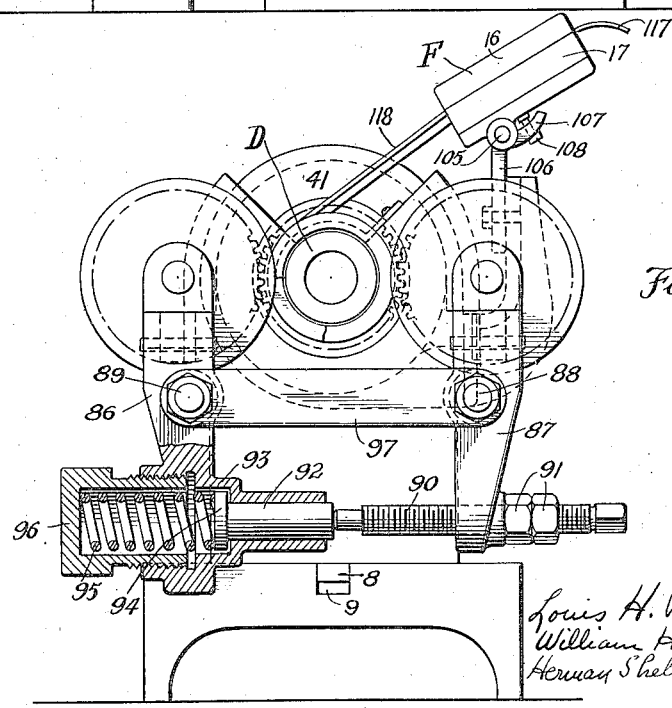
Louis H. Brinkman
William H. Fulton and
Herman Shellner
INVENTORS
BY
Thomas Howe ATTORNEY Patented Apr. 29, 1924.

1,492,067

UNITED STATES PATENT OFFICE.

LOUIS H. BRINKMAN, OF GLEN RIDGE, WILLIAM H. FULTON, OF IRVINGTON, AND HERMAN SHELLMER, OF NEWARK, NEW JERSEY, ASSIGNORS TO TITEFLEX METAL HOSE CORPORATION, A CORPORATION OF NEW YORK.

APPARATUS FOR MAKING TUBES.

Application filed March 8, 1917. Serial No. 153,262.

*To all whom it may concern:*

Be it known that we, LOUIS H. BRINKMAN, WILLIAM H. FULTON, and HERMAN SHELLMER, citizens of the United States, residing at Glen Ridge, county of Essex, and State of New Jersey, Irvington, county of Essex, and State of New Jersey, Newark, county of Essex, and State of New Jersey, respectively, have invented new and useful Improvements in Apparatus for Making Tubes, of which the following is a specification.

This invention relates to strip formed tubes and particularly to flexible tubes having fixed joints between adjacent convolutions and a groove extending longitudinally of the strip although not limited thereto.

One object of the invention is to provide an improved tube wherein the metal of the joint is spun into close and solid relationship.

In the Patent No. 1,198,391 issued September 12, 1916, on an invention of L. H. Brinkman, is shown apparatus for making a tube but on account of the engagement between the relatively rotatable forming parts, which is similar to that of a nut and screw, one of the parts is moved longitudinally so that to keep it within the bounds of a machine of reasonable size (where a considerable length of tube is made) requires that the mechanism shall be reversed at intervals.

It is another object of the present invention to provide an apparatus which does not require reversal but forms the tube by continuous operation which may be continued as long as desired.

Another object of the invention is to provide apparatus including means for spinning the metal of the seam.

Another object of the invention is to provide a sectional die which facilitates its construction and repair.

A further object of the invention is to provide means for forming the tube from the strip without back and forth bending so that weakening of the metal is avoided.

Other and ancillary objects of the invention will appear hereinafter.

In the accompanying drawings which illustrate the invention,

Fig. 1 is a side elevation of a machine and a portion of the exterior of a tube;

Fig. 2 is an end elevation of the machine looking from the right hand of Fig. 1 and showing a lubricating fluid circulating system which has been omitted from Fig. 1 for the sake of clearness;

Fig. 3 is a top plan view, partially in section, on an enlarged scale, of a portion of the apparatus of Fig. 1, the tube being shown in exterior view and also in longitudinal section;

Fig. 4 is a side elevation of the apparatus of Fig. 3, partially in section, but with the tube removed;

Fig. 5 is an end elevation of the apparatus of Fig. 4 looking from the right of that figure;

Figs. 6, 7, and 8 are side views of die sections;

Fig. 9 is a face view of two of the die sections looking at the strip entrance face on the line 9—9 of Fig. 6;

Fig. 10 is a section on the line 10—10 of Fig. 6;

Fig. 11 is a section on the line 11—11 of Fig. 6;

Fig. 12 is a side elevation of the preliminary former;

Fig. 13 is an end elevation of the apparatus of Fig. 12 at the exit end;

Fig. 14 is an end elevation of the former at the entrance end;

Fig. 15 is a top plan view of the bottom portion of the preliminary former as shown in Figs. 12-14 inclusive;

Fig. 16 is a side elevation partly in section of a bearing;

Fig. 17 is a view partly in section of the device of Fig. 16; Fig. 17 being in a plane 90° removed from Fig. 16;

Fig. 18 is an elevation of the internal rollers supporting the tube from the interior during the spinning operation;

Fig. 19 is an end elevation of the apparatus of Fig. 18; and

Fig. 20 is an enlarged fragmentary section of the tube strip as it appears in the first few turns of its formation and illustrating the progress of formation of the strip as received from the preliminary former into the tube which is subsequently passed under the spinning rolls.

Referring to the drawings, the apparatus comprises a suitable frame A on which is rotatably mounted a hollow spindle B driven by any suitable means as for instance a belt pulley C. Secured to the spindle B is a hollow arbor or mandrel D about which the tube strip is wound, and surrounding the arbor is a die E, for forming the strip into the tube, receiving the strip from a preliminary former F. Also mechanism G is provided for spinning and compacting the seam, the inner support being carried at the end of a rod H extending through the mandrel or arbor. A circulating system I for lubricating liquid may be supplied.

With this general survey, the drawings may now be referred to more in detail. The mandrel D may be secured in driving relation to the rotating spindle by driving its conical end 1 into a conical socket in the spindle, this being a well known manner of forming driving connections. It is employed in securing the tools of milling machines to the driving spindles and in numerous other well known applications. To remove the mandrel D, the nut 2, which is screw threaded on the arbor, may, by turning, be forced against the end of the spindle and so forcibly withdraw the end of the mandrel from its socket.

Fixed upon the arbor is a spur gear 3 for driving the spinning rollers as will be hereinafter referred to. An abutment nut 4 for limiting the movement of the die is in screw threaded engagement with the arbor so that it may be adjusted and it may be secured in any adjusted position by a set screw 5'. The arbor has a smooth unthreaded surface 5 which is cylindrical and of substantially uniform diameter while the surface 6 also smooth, is tapered, the diameter growing larger toward the right (see Fig. 4). A die for forming the tube from the strip is carried on the support 7 which may slide upon the frame longitudinally of the arbor but is prevented from turning about the arbor axis by means of a projection 8 having an easy running fit within the slot 9 in the supporting frame. By making the projection 8 of suitable length, as shown, turning of the die structure about a vertical axis, if there should be any such tendency, is prevented. The support 7 carries a frame 11 for the die which at one side is adapted to abut against the nut 4, ball bearings 11' serving to permit relative turning of the arbor and die with a reduced amount of friction. On the other side of the die frame, forming channels for the tube are constructed of a number of segmental sections 12, 13, and 14, which are secured together and to the die frame by screws 15.

The preliminary former (see particularly Figs. 12 to 15, inclusive) comprises an upper member 16 and a lower member 17. The lower member 17 has at the end for receiving the flat ribbon, a broad shallow channel 18 with a tapering channel 19 at one side. The channel 18 gradually develops into an intermediate channel 20 which becomes deeper as the exit end is approached and has upon one side the warped wall 21 and upon the other side a shoulder 22. Also the channel 19 gradually broadens and there is a shoulder or rib 23 between the channels 19 and 20. The member 16, proceeding from the receiving end, has the rib or projection 24 which extends within the channel 19 causing a downward bending of the edge of the ribbon at 25. The rib 24 gradually broadens out, keeping in contact with the ledge 26 throughout its length and following along the rib 23 with clearance substantially equal to the thickness of the ribbon. The groove 27 in the upper portion of the former receives the rib 23 and within the groove 20 extends a projection 28 which has a clearance about it substantially equal to a thickness of the ribbon. A right angled shoulder 29 has between it and the shoulder 22 a clearance substantially equal to a thickness of the ribbon and abuts against the shoulder 30 of the section 17. It will thus be seen that the sections are held in properly adjusted lateral position by engagement of shoulders on the two sections; and that the flat ribbon entered within the end of the former as shown in Fig. 14 will gradually have its section changed so that it has a groove longitudinally of the strip, one side bent at a right angle and the other having a double bend so as to form a channel. This conformation is clearly shown in Fig. 20 wherein the groove is shown at 31. The ribbon of this section is then fed into the die about the arbor.

The preliminary former has its two halves secured together by screws as 32' and 33', and the upper and lower sections may be forced more or less tightly together so as to cause more or less of a frictional gripping on the strip by adjusting the screws. The former is pivotally supported at 105 upon a supporting member 106 secured to the forming die. The support 106 carries the curved arm 107 carrying a screw 108 by which the former may be adjusted about the pivot 105 and secured in adjusted position.

When the die sections 12, 13, and 14 are secured in place there is formed a structure having helically arranged ribs or thread segments 34, 35, 36, 37, etc., having bending channels 38 and 39 at the bases of the threads. The bending channel 38 is of a form at the beginning as shown in Fig. 9 gradually merging into a double right angled section as shown in Fig. 11. The die is cut away at 41 to permit the entrance of the strip into the die and at the exit of the bending channel 38 into this recess it is of the double right angled section as referred to. Simultaneously with the entry of the strip portion 33 into the bending channel 38 of the die the other edge of the strip, having the channeled portion 32, enters into the channel 39 and receives within it the radially extending flange 33 of the adjacent edge of the preceding convolution. As the two edges thus proceed around the die they are bent over into the interfolded position as shown at 34 and in this condition emerge from the die channel into the recess 41. The interfolded portions then enter into the helical channel between the threads 35 and 36 and progress helically through succeeding helical channels until discharged from the die. During the passage of the strip through the die the ribs referred to enter within and substantially fill the groove 31 in the strip.

The structure of the sections 12, 13, and 14 is shown more in detail in Figs. 6 to 11 inclusive. Looking at the section 12 from the right of Fig. 3, it comprises (see Fig. 7) a circular flange or projection 42 radially outside of which is a groove 43 adapted to receive the right angled portion 33 from the preliminary former at its intake end 44. As the groove 43 progresses about the die it has, near its other end, a sloped surface 45 which gradually causes the groove to become less and less deep and turns the edge of the ribbon outwardly until at 46 the groove merges into the plane face 47 so that the edge of the ribbon is bent into a radial position forming a right angled bend between the outer face of the flange 42 and the face 47 at the exit end 48.

In Fig. 8 the face of section 13 looked at from the left of Fig. 3 is shown to have at its intake end the channel having the plane face 49 between which and the projection 42 is a clearance for one thickness of ribbon, 50 being the sloping bottom of the channel. This sloping bottom gradually becomes right angled at 51 and the circumferential recess 52 is circumferentially tapering, being small at its beginning and having its largest size 53 at the exit end of the section. This recess is for receiving the strip edge turned up by the sloping surface 45. It will appear that when the two section faces as shown in Figs. 7 and 8 are placed together the channel 38 will be formed between them which at the beginning is as shown in Fig. 9 and at the end as shown in Fig. 11. Looking at the face of the section 13 from the right of Fig. 3, (see Fig. 6) the channel having a bottom 54 is of a height at its intake end as shown at 55. The side 56 of the groove, however, is warped, the groove gradually contracting in radial width until it merges with a perpendicular wall at 57, the groove being substantially rectangular from this point to the exit at 58.

The opposite side of the channel from the bottom 54 is formed by the adjacent edge of the section 14. The result of this structure is to cam the convolution edges 32 and 33 over into the position as shown at 34 (see Fig. 20). The side of the section 14 is cut away at 58' to accommodate the interfolded seam as thus bent down. The remaining channels are in the section 14 and are of uniform cross section, the desired interfolding having taken place. The additional threads are what have been termed "stripping" threads inasmuch as they are concerned with the progress of the tube along the mandrel as distinguished from the preceding thread sections which are concerned in bending and interfolding the strip.

An arc shaped finger 117' extends within the channel 39 at its intake and this finger is stationary, being secured to the die as shown, and supports the strip in the channel and gives the desired curvature to the entering strip. Otherwise the tension on the entering strip and the fact that it is straight would cause it to fail to conform to the shape of the channel so that the tube would not be perfect.

After leaving the die, the tube encounters the spinning rolls 59 and 60 which bear upon the exterior of the seam and are grooved to conform to the desired exterior of the tube. The seam beneath the spinning rolls is supported upon the inside by rolls 61 and 62 rotatably mounted in a rod 63 which extends through the interior of the mandrel and spindle and is secured in a bracket 64 fixed to the end of the frame. Turning of the rod 63 may be prevented by making its end 65 square and entering it within a square hole within the bracket. It may be also secured by a set screw 66. As shown most clearly in Figs. 18 and 19 the rolls 61 and 62 may be mounted in a head 67 fixed to the end of the rod 63. This head is provided with radial slots 68 and 69 for receiving the rolls which are rotatably mounted on pins 70 and 71 having their ends inserted in sockets 72 and 73 in the head 67, the other ends being inserted in sockets 74 and 75 in the cap plate 76 secured to the head 67 by a screw 77. Between the slots 68 and 69 and the end of the head 67 are circumferentially opening slots for receiving the pins 70 and 71. When therefore the plate 76 is removed, the outer ends of the pins may be lifted and the pins withdrawn from the sockets 72 and 73 to remove the rolls, while they can be inserted by a reverse operation.

The rolls 59 and 60 are fixed upon shafts 78 and 79 to which also are fixed the gears 80 and 81 meshing with the gear 3. This gearing is made of such ratio that the peripheral speed of the rolls 59 and 60 is faster than the speed of the seam with which they engage. About 20% faster has given good results. It will also be observed that the peripheries of the rolls adjacent the seams move in the same direction as the portions of the seam with which they engage. The result of this is that the metal of the seam is spun and forced into most intimate and compact relation. The shafts 78 and 79 are rotatably mounted in bearings 82 and 83 supported from the die frame and also in bearings 84 and 85 mounted in the ends of arms 86 and 87 pivoted to the die frame at 88 and 89. In the lower end of the arm 87 is screw threaded an adjustable screw 90 which may be locked in position by jam nuts 91 and at its inner end bears upon a plunger 92 slidable in a casing 93 fixed to the lower end of the arm 86. Bearing against the head 94 of the plunger is a spring 95 secured by an adjustable cap 96 which is screw threaded into the case and places a greater or less tension upon the spring according to whether it is screwed into the casing more or less. A strengthening bar 97 may extend between the extremities of the pivot pins 88 and 89. It will be seen that this arrangement forces the rolls 59 and 60 yieldingly against the seam with a pressure which may be determined by the adjustment of the screw or the cap 96 or both. The bearings 82, 83, 84 and 85 are so constructed as to permit the slight turning necessary to adjustment of the rolls 59 and 60, the clearance which usually exists between the spur gears being sufficient to permit such adjustment so far as the gears 80 and 81 are concerned. These bearings may be of the forms shown in Figs. 16 and 17 wherein 98 is the hole through which the shaft extends, the head 99 in which this hole is made being formed integrally with a cylindrical plug 100 which extends into and is adapted to turn in a cylindrical socket 101 in the support 102. The plug is prevented from withdrawal from the socket by means of a pin 103 which extends through the walls of the socket and through a slot 104 cut in the side of the plug. It will be noted that the pin fits loosely in the slot so that a limited turning movement of the plug in the socket is permitted.

A rotary pump 109 may be driven by a belt 110 from a pulley 111 which, in turn, is driven by a belt 112 from the pulley 113 on the spindle B. This pump may force lubricating fluid through the pipe 114 into the recess 41 of the forming nut onto the work so as to lubricate the same. The drippings will fall into the pan 115 on the frame from which they may be drawn through the pipe 116 into the pump 109. Thus a continuous circulation is effected.

In the operation of the apparatus to form a tube, the end of a flat metal ribbon as shown at 117 of the desired width and thickness is passed through the preliminary former F, emerging therefrom with a section conforming to the section of the channel at its exit as shown in Fig. 13, the strip section being as shown in Fig. 9. The die is pushed to the right (see Fig. 4) and the end of the strip is inserted in the slot 118'. The strip may also be shaved off at its sides to narrow it so that it will be easily threaded through the die. The mandrel is then turned and the strip is inserted in the die with its edges inserted in the channels 38 and 39 of the die and with its central portion about the thread 34, 118 indicating the strip as it passes from the former to the die. The turning of the mandrel then winds the strip about it, drawing it in through the former and the die channels. The strip thus secured to the mandrel, acts as a thread with which the die cooperates after the manner of a nut. The latter is thus forced to the left (see Figs. 3 and 4) until it comes against the nut 4. The die is now in its normal operating position.

The taper of the portion 6 is only a few thousandths of an inch and is for the purpose of insuring a pressure against the inside of the tube so as to produce the friction necessary to cause the strip turns to be bound tightly to the mandrel so that there will be a torsional frictional grip on the strip. The diameter of the cylindrical portion 5 of the mandrel, is such as to support the strip in place in the die, but without pressing thereagainst so as to produce undue frictional losses. The strip in passing about the mandrel and through the die, is thus formed into a helix the contiguous edges of which are interfolded in a manner as hereinbefore described, the die acting upon this helical structure in a manner similar to that of a nut upon a screw and, being itself unable to move on account of its abutment against the nut 4, the tube is continually forced off the end of the mandrel as long as the machine continues in operation. After passing off the end of the mandrel the tube passes over the rollers 61 and 62 which bear against the inside of the seam, supporting the same against the action of the rollers 59 and 60. It will be observed that the rollers 59, 60, 61 and 62 are set at such angles and have such longitudinal displacement as adapt them to the helical form and also the pitch of the tube being made. The spinning up of metal of the seam by the rollers as hereinbefore described results in a compacting and solidifying of the seam which renders the joint more permanent and reliable. Out of the rolls just referred to passes the completed, corrugated, flexible tube as shown in exterior at 119.

It will be observed that from the time the flat strip enters the former until it is finally formed into the tube there is no reverse bending but, on the contrary, the bending is continuous in one direction. In other words, a bend in the metal having been started it remains the same or else is increased in the same direction. The bending force is never reversed so as to straighten out a bend once made or cause a bend in the reverse direction. This avoidance of to and fro bending of the metal prevents fatigue thereof and the structure produced is stronger and more reliable.

By the term "spinning" as used herein is meant an operation wherein the metal spun is caused to flow or stretch by rubbing its surface, the spinning member at any one time operating upon only a small part of the metal to be spun and the operation upon the whole is accomplised by moving the metal so that different portions are successively operated upon.

While the invention has been illustrated by one form of tube, an embodiment of apparatus and the invention may have other embodiments without departing from its spirit; the invention is not therefore limited to the structures shown in the drawings.

What we claim is:—

1. In an apparatus for forming a tube from a strip, the combination with two relatively rotatable members adapted to receive the strip between them, of means for relatively rotating said members, the said members being concentrically arranged, one of said members having channels with cam walls for bending the strip transversely adapted to interfold edges of the strip and the other having a smooth surface along which the tube may longitudinally slide.

2. In an apparatus for forming a tube from a strip, the combination with a mandrel and a concentrically arranged die, said mandrel having a smooth surface along which the tube may longitudinally slide, said die having channels with cam walls for bending the strip transversely adapted to interfold the edges of the strip, of means for relatively rotating said die and mandrel.

3. In an apparatus for forming a tube from a strip, the combination with a mandrel and a concentrically arranged die, said mandrel having a smooth surface along which the tube may longitudinally slide, said die having channels with cam walls for bending the strip transversely adapted to interfold the edges of the strip, of means for relatively rotating said die and mandrel, said mandrel having a longitudinally tapered portion.

4. In an apparatus for forming a tube from a strip, there being a longitudinal groove in the strip, to form a corrugated tube, the combination with two relatively rotatable concentrically arranged members adapted to receive the strip between them, of means for relatively rotating the said members, one of said members having bending channels for interfolding the edges of the strip and ribs or threads corresponding to said groove, the other member having a smooth surface along which the tube may longitudinally slide.

5. In an apparatus for forming a tube from a strip, the combination with a mandrel and a concentrically arranged die, said die having channels with cam walls for bending the strip transversely adapted to interfold edges of the strip, means for preventing longitudinal movement of the die as the mandrel is rotated, and means for rotating the mandrel.

6. In an apparatus for forming a tube from a strip, the combination with a mandrel and a concentrically arranged die, said die having bending channels for interfolding the edges of the strip, and said mandrel having a longitudinally tapered portion, of means for rotating said mandrel, and means for adjusting the position of said die with relation to the mandrel.

7. In an apparatus for forming a tube from a strip, the combination with a mandrel and a concentrically arranged die, said die having bending channels for interfolding the edges of the strip, of means for rotating said mandrel, said die being adapted to slide longitudinally along said mandrel, and means for limiting the longitudinal movement of said die.

8. In an apparatus for forming a tube from a strip, the combination with a mandrel and a concentrically arranged die, said die having bending channels for interfolding the edges of the strip, of means for rotating said mandrel, said die being adapted to slide longitudinally along said mandrel, and adjustable means for limiting the longitudinal movement of said die.

9. A die for forming a metal strip into a tube having channels for receiving the strip to be operated upon including channels having cam walls for bending the strip edges transversely of the strip, adapted to interfold the said edges to unite adjacent convolutions of said strip said die being formed of sections divided through the said channels.

10. A die for forming a metal strip, having bending channels for receiving the strip to be operated upon having cam walls for bending the strip transversely and adapted to interfold the edges thereof to unite adjacent convolutions, and formed of sections divided through the said channels.

11. In an apparatus for forming a tube from a strip, the combination with a die having an opening, of a rotating member inserted within said opening, and means for rotating said member, said die having channels having cam walls for bending the strip transversely adapted to interfold the edges of the strip, and said die being formed of sections divided through said bending channels.

12. In an apparatus for forming a tube from a strip, the combination with a concentrically arranged die and mandrel, of means for rotating said mandrel, said die having helical bending channels for interfolding the edges of the strip, and helical ribs or threads between said bending channels and corresponding to a longitudinal groove in the strip, said die also comprising stripping threads near the exit end to aid in forcing the tube from the die, and said mandrel having a longitudinally tapered portion, and means for preventing movement of the die with relation to the mandrel as the mandrel rotates in the formation of the tube.

13. In an apparatus for forming a tube from a strip, the combination with a concentrically arranged die and mandrel, of means for rotating said mandrel, said die having helical bending channels for interfolding the edges of the strip, and helical ribs or threads between said bending channels and corresponding to a longitudinal groove in the strip, said die also comprising stripping threads near the exit and to aid in forcing the tube from the die, and means for preventing longitudinal movement of the die with relation to the mandrel as the mandrel rotates in the formation of the tube.

14. In an apparatus for forming a tube from a strip, the combination with means for helically forming the strip and seaming the edges of adjacent convolutions, of means for spinning the metal of the seam.

15. In an apparatus for forming a tube from a strip, the combination with means for helically forming the strip, and interfolding the edges of adjacent convolutions, of means for spinning the metal of the interfolded parts.

16. In an apparatus for forming a tube from a strip, the combination with means for helically forming the strip and seaming the edges of adjacent convolutions, said means involving the rotation of the tube, of a roller bearing upon the seam, and means for driving the roller at a speed such that its peripheral speed is greater than that of the seam against which it bears.

17. In an apparatus for forming a tube from a strip, the combination with two relatively movable members adapted to receive the strip between them, of means for relatively moving said members to coil said strip about one of them, one of said members having channels with cam walls for bending the strip transversely adapted to interfold edges of the strip and the other of said members having a smooth surface along which the tube may longitudinally slide.

18. In an apparatus for forming a tube from a strip, the combination with means for helically forming a strip and seaming the edges of adjacent convolutions, of a roller bearing upon the seam, and means for positively driving the roller at a speed such that its peripheral speed is greater than that of the seam against which it bears.

19. In an apparatus for forming a tube from a strip, the combination with a coiling member adapted to receive the strip upon its interior and helically coil the same, said coiling member having bending channels with cam walls for bending the strip transversely adapted to interfold edges of the strip, and means for continuously and indefinitely passing the strip through said coiling member.

20. In an apparatus for forming a tube from a strip, there being a longitudinal groove in the strip, to form a corrugated tube, the combination with a coiling member adapted to receive the strip upon its interior and helically coil the same, said member having bending channels with cam walls for bending the edges of the strip transversely to interfold the same and ribs or threads corresponding to said groove, and means for continuously and indefinitely passing the strip through said coiling member.

21. In an apparatus for forming a tube from a strip, the combination with a concentrically arranged die and mandrel, said mandrel being rotatable with relation to the said die, having a longitudinal tapering portion and being smooth so as to permit the tube to slide longitudinally thereon, said die having bending channels adapted to receive and interfold the strip edges and ribs corresponding to a longitudinal groove in the strip, said ribs being located between bending channels, means for preventing longitudinal movement of the die with relation to the mandrel as the tube is formed, means for rotating the mandrel and roller bearing upon the interfolded parts after the tube has emerged from the die, means for driving the said roller at a speed such that its periphery moves at a speed greater than that of the interfolded parts of the tube against which it bears, and a support for the seam upon the interior of the tube.

22. The combination with a stationary former, for shaping a strip cross-section preliminarily to entering the strip into seaming and coiling mechanism for forming a tube from the strip, the said former being stationary and comprising surfaces for preparing the strip edges for entry into the coiling and seaming apparatus, and adapted to form within the strip a longitudinal groove of a cross-section substantially the same as that between corrugations in the completed tube, of means for helically coiling the strip and interfolding the edges of adjacent convolutions to form a tube.

In testimony whereof we WILLIAM H. FULTON and HERMAN SHELLMER have signed this specification this first day of March, 1917, and I, LOUIS H. BRINKMAN, have signed this specification this sixth day of March, 1917.

LOUIS H. BRINKMAN.
WILLIAM H. FULTON.
HERMAN SHELLMER.